Patented June 27, 1950

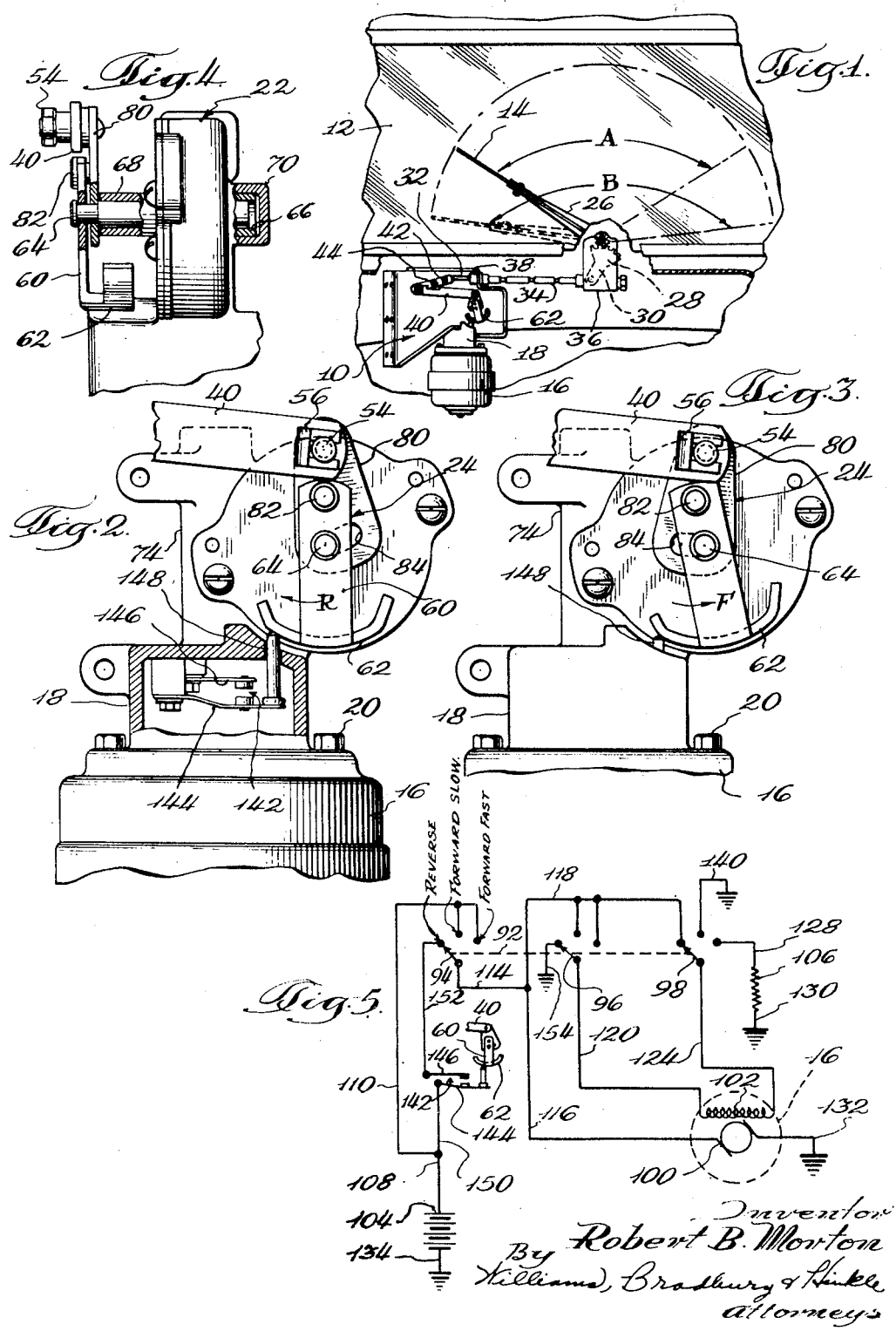

2,513,247

UNITED STATES PATENT OFFICE 2,513,247

WINDSHIELD WIPER

Robert B. Morton, Chicago, Ill., assignor to Stewart-Warner Corporation, Chicago, Ill., a corporation of Virginia Application October 12, 1945, Serial No. 622,008

10 Claims. (Cl. 318—437)

The present invention relates to windshield wipers and particularly to windshield wiper actuating means operated by reversibly rotatable driving means.

The primary object of the pressent invention is to provide a new and improved windshield wiper of a type wherein the wiping element is parked at a point beyond the normal range of operation of the wiping element so that it is parked in an out-of-the-way location.

Another object of the present invention is to provide a windshield wiper of the character foresaid driven by a reversible electric motor and in which the wiping element is movable through a first and normal operating range and then is moved through a longer and parking range and in which the wiping element is automatically stopped at its limit of movement in the parking range.

Another object of the present invention is to provide a new and improved windshield wiper actuating mechanism including a variable length crank arm, the effective length of which is automatically changed in response to its direction of rotation and, more specifically, wherein the effective length of the crank arm is greater when the motor is operated in a reverse direction.

Other objects and advantages of the present invention will become apparent from the ensuing description of illustrative embodiments thereof, in the course of which reference is had to the accompanying drawings, in which:

Fig. 1 is a fragmentary front elevational view illustrating an installation of the apparatus of the present invention in an automobile;

Fig. 2 is a fragmentary front elevetional view of a windshield wiper actuating and control mechanism constructed in accordance with the present invention; the crank pin being illustrated at its greater radial distance from the center of rotation, i. e., when the motor is operating in its reverse direction to provide a longer crank arm;

Fig. 3 is a view similar to Fig. 2 illustrating the crank pin at its shorter radial distance corresponding to the forward rotation of the motor to provide a shorter crank arm;

Fig. 4 is a side elevational view of the apparatus shown in Figs. 2 and 3; and

Fig. 5 is a schematic wiring diagram showing the electrical control embodied in the apparatus.

An automobile installation of the windshield wiper actuating and control mechanism of the present invention is illustrated in Fig. 1 to which brief reference is first had. The apparatus consists, in the main, of a mounting bracket 10 adapted suitably to be secured to the automobile below the windshield 12. A wiping element 14, which may be of conventional construction, is oscillated through a normal smaller angular range indicated by the reference character A when the driving means, in this case a reversible electric motor, operates in a forward direction and through a greater angular range B when the motor operates in a reverse direction. The normal range of movement is that ordinarily used while the greater range is such that the limits thereof are so located that when the wiping element is at a limit, it is not in the range of vision of the driver of the automobile. As will be brought out hereinafter, the wiping element is automatically stopped when at one of the limits of the greater range of movement and preferably at the innermost limit whereat it is shown by dotted lines.

The motor 16 is secured to the mounting bracket 10, and more particularly to a lower switch and coupling housing portion 18 by suitable means such as the securing bolts 20. The portion 18 preferably constitutes part of a die casting including also a gear housing 22 (see Fig. 4) through which a combined cam and adjustable length crank arm mechanism 24 is rotated.

The adjustable length crank arm mechanism 24 may be operatively connected to the windshield wiping element 14 by suitable means, the mechanism illustrated including certain structural features illustrated and disclosed in the copending application of Homer F. Malone, application Serial No. 591,467 filed May 2, 1945, and assigned to the assignee of the instant application.

The wiping element 14 is mounted upon an oscillatable support 26 (see Fig. 1) operated by gearing including an oscillatable segment gear 28 having a crank arm 30. The crank arm is oscillated by a Bowden wire 32 reciprocable in a sheath 34 of a novel construction disclosed and claimed in the previously referred to copending application of Homer F. Malone. The opposite ends of the sheath are secured to a bracket 36 supporting the segment gear 28 and to a flanged portion 38 of the mounting bracket 10.

The variable length crank arm mechanism 24 is connected to the Bowden wire through a pair of linkage members 40 and 42. The latter is pivotally movable about a pivot pin 44 mounted in the mounting bracket, and to which it is detachably secured by suitable means. The end of the Bowden wire is pivotally secured to one end of member 42 and the other end of the member 42 is pivotally secured to one end of linkage member 40. The other end of linktage member 40 is pivotally secured to a two position crank pin 54 of the variable length crank arm by a detachable fastener 56.

The radial distance of the crank pin 54 from its axis of rotation and the effective length of the crank arm actuating the linkage mechanism and wiping element, is dependent upon the direction of rotation of the motor 16 and of the cam anl crank mechanism 24. In the forward direction of rotation, the crank pin is located at a shorter radial distance from its axis of rotation than it is in the reverse direction of rotation. Thus, the linkage mechanism and windshield wiping element are oscillated through a lesser angle in the forward direction of rotation than in the reverse direction of rotation. As a consequence, the wiping element is moved through the lesser angular range A in forward drive and through the greater angular range B in reverse drive.

The combined cam and variable length crank arm mechanism 24 includes a rotatable supporting and cam defining arm 60. It includes a cam portion 62 for operating a parking switch to be described shortly. The member 60 is secured to the one end of a shaft 64 mounted for rotation in a pair of spaced apart bearings 66 and 68, the former of which is mounted within a boss 70 formed integral with the gear housing 22. The bearing 68 is in effect a bushing secured in suitable manner, as by a press fit, to a generally vertically extending portion of the gear housing 22, as best illustrated in Figs. 3 and 4.

The shaft 64 is rotatable in opposite directions by the motor 16. The motor shaft (not shown) is suitably coupled to a vertical driving shaft (also not shown) rotatably supported in a generally vertical integral shaft housing 74 forming part of the main die casting and operatively connected to the shaft 64. The construction of the shaft and its connection to the motor shaft may be along the lines disclosed and claimed in the previously referred to copending application of Homer F. Malone.

The effective length of the crank arm is determined by the radial distance of the crank pin 54 from its center of rotation, which is that of the shaft 64. In the forward direction of rotation, the crank pin is nearer to the center of rotation, thereby to provide a shorter crank arm as indicated best in Fig. 3. In the opposite or reverse direction of rotation the crank pin 54 is at a greater radial distance from its center of rotation, thereby to provide a crank arm of greater effective length, as best illustrated in Fig. 2. The crank pin 54 is mounted at one end of a two position link 80 pivotally secured at one end to a point of the cam-defining arm 60 offset relative to the center of rotation, as by a pivot pin 82. The opposite end of the link 80 is pivotally secured to the crank pin 54.

The link 80 is movable between limits determined by a slot 84 in link 80 riding on shaft 64. At one limit of movement, that illustrated in Fig. 3, the crank pin 54 is nearer to the shaft 64 than it is at the other limit of movement, illustrated in Fig. 2.

The present invention also contemplates the provision of a control for the motor such that the motor may be selectively operated at two different speeds in a forward direction and is automatically stopped or parked in parking position when the motor is conditioned for operation in a reverse direction. Referring now to Fig. 5, the control is shown to be effected by a manually operable multi-position switch indicated as a whole by reference character 92 and comprising three switch blades 94, 96 and 98, all mechanically connected for simultaneous movement and movable into three circuit controlling positions. The circuit controlling positions are reverse, slow speed forward, and fast speed forward.

In the fast speed forward position, the motor 16, which is a direct current shunt motor having an armature 100 and a shunt field 102, is operated with a reduced shunt field. The armature and shunt field are both connected to a suitable source of power such as the battery 104 and a resistor 106 is connected in series with the shunt field. One terminal of the battery is connected by conductors 108 and 110 to switch blade 94 in its fast forward speed position. The switch blade is connected by conductors 114 and 116 to the motor armature, and by conductors 114 and 118 and switch blade 96 in its fast forward speed position and conductor 120 to one terminal of the shunt field winding 102. The other terminal of the winding is connected in series with resistor 106 and to ground through conductor 124, switch blade 98, conductor 128, and conductor 130. The armature and field circuits are completed through the armature ground connection 132 and the battery ground connection 134.

In the slow speed forward position the motor is operated with full field. The armature connection remains unchanged but the field is connected directly to ground through conductor 118, switch blade 96, conductors 120 and 124, switch blade 98, and ground connection 140.

In the reverse position of the switch, the motor is operated at slow speed but in reverse direction and under the control of a parking switch, indicated as a whole by reference character 142. The switch 142 includes a pair of switch blades 144 and 146 (see especially Fig. 2), normally biased into engagement with each other and adapted to be moved out of engagement by a switch actuating pin 148 periodically engaged by the cam 62 of the combined crank arm and cam mechanism 24. The cam is so arranged relative to the movement of the wiping element that the motor energizing circuit is broken and the motor stops when the wiping element is at the parking limit of its movement in the parking range B. The parking switch 142 is preferably mounted within the portion 18 of the housing, as disclosed in the previously referred to copending Homer F. Malone application. The energizing circuit for the motor through the parking switch is completed through conductor 150 and blades 144 and 146 of the parking switch, conductor 152, switch blade 94 in its reverse position, conductor 114 and conductor 116 leading to the armature, and conductor 118, switch blade 98 in its third position and conductor 124 leading to one terminal of the shunt field winding. The shunt field circuit is completed through conductor 120, switch blade 96 in its third position, and a ground conductor 154. It will be noted that in this reverse position the flow of current through the shunt field is in a direction opposite to that obtaining in the forward drive, with the result that the motor rotates in the reverse direction.

In the following description of the operation of the apparatus of the present invention, it is assumed that the motor has previously been stopped with the wiping element in parked position. Under these conditions the control switch 92 is in the position in which it is indicated in Fig. 5, i. e., in its reverse position and the parking switch 142 is also in its indicated open position.

To place the apparatus into operation, it is necessary simply to operate switch 92 into either of its two other positions. It is assumed first that the switch is moved to its intermediate or slow speed forward position. The motor armature and shunt field are thus connected directly across the battery through the switch blades 94, 96 and 98 through circuits previously described so that the motor rotates in its forward direction at slow speed. The motor shaft rotates the combined cam and variable length crank arm means 24 through the shaft 64. The linkage mechanism 40—42 is oscillated and the latter of the linkage members reciprocates the Bowden wire 32 with the result that the windshield wiper element 14 is oscillated by means including the sector gear 28. In the forward direction of rotation the parking switch 142 is periodically opened but it exerts no effective control because it is in a circuit which is open in the forward direction of rotation.

In order to operate the wiping element at a faster speed, it is necessary only to move the control switch 92 to its other forward position. When this is done, the motor armature is connected directly across the battery but the shunt field is connected across the battery through the resistor 106, as previously described. As a consequence, the motor operates with a reduced field and at a higher speed.

The windshield wiper element is oscillated through a shorter angular range in the forward direction because of the shorter effective length of the crank arm—the crank pin 54 being at the nearer of its two positions relative to its axis of rotation. More specifically, the crank pin is in the position in which it is illustrated in Fig. 3.

In order to stop or park the windshield wiper it is necessary to move the control switch 92 into its reverse position. When this is done and the motor reverses, two things occur. In the first place the effective length of the crank arm is made longer and the parking switch is placed in control of the deenergization of the motor.

When the motor is reversed the crank pin carrying link 80 oscillates about its pivot 82 and moves from the position in which it is illustrated in Fig. 3 to the one in which it is illustrated in Fig. 2. The crank pin thus moves further from its axis of rotation with the result that the effective length of the crank arm is increased. As a result the windshield wiper element is now conditioned for oscillation through the greater range of angular movement B.

The windshield wiping element is stopped at the innermost limit of its movement in the wider range of movement by the parking switch 142. As previously described, the cam is so constructed and arranged, relative to the windshield wiping position, that when the wiping element is at its inner limit the cam 62 opens switch 142 by depression of the switch operating pin 148 and movement of switch blade 144 away from switch blade 146.

While but one embodiment of the present invention has been illustrated and described in detail, it should be understood that the details thereof are not intended to be limitative of the invention, except in so far as set forth in the accompanying claims.

Having thus described my invention, what I claim as new and desire to secure by Letters Patent is:

1. In a windshield wiper having a wiping element adapted to be oscillated over the surface of a windshield and to be parked beyond the normal range of its oscillation, an actuating mechanism, including in combination, reciprocable means for actuating the windshield wiping element, and means including a crank arm mechanism having a variable length crank arm, the length of which is automatically variable in response to the direction of rotation of the mechanism, for operating said reciprocable element.

2. In a windshield wiper having a wiping element adapted to be oscillated over the surface of a windshield and to be parked beyond the normal range of its oscillation, an actuating mechanism of the type having reciprocable means for actuating the windshield wiping element, characterized in that means including a crank arm mechanism having a variable length crank arm, the length of which is automatically variable in response to the direction of movement of the mechanism, are provided for reciprocating the reciprocable element.

3. A windshield wiper actuating mechanism, including in combination, a reciprocable actuating member, a pivotally mounted linkage member for reciprocating said first mentioned member, a second linkage member connected to said first mentioned linkage member, and means including a crank having an effective length varying with the direction of rotation of the crank for moving said last mentioned linkage member.

4. In a windshield wiping apparatus having a wiping element adapted to be oscillated over the surface of a windshield and to be parked beyond its normal range of oscillation, a variable length crank mechanism for actuating the windshield wiping element, including in combination, a linkage member, means pivotally supporting said member for rotation in opposite directions about a point disposed to one side of the pivotal point, a crank pin mounted at the free end of said linkage member, and means for limiting the pivotal movement of said linkage member when said rotatable means rotates in opposite directions.

5. In a windshield wiping apparatus having a wiping element adapted to be oscillated over the surface of a windshield and to be parked beyond its normal range of oscillation, a variable length crank mechanism for actuating the windshield wiping element, including in combination, a supporting member rotatable about a predetermined axis, a linkage member pivotally mounted upon said first mentioned member at a point offset with respect to said axis of rotation, a crank pin mounted at a free end of said linkage member, and means for limiting pivotal movement of said linkage member.

6. A variable length crank mechanism for actuating a windshield wiping element, including in combination, a supporting member, means including a shaft for rotating said member about a predetermined axis, a linkage member pivotally mounted upon said first mentioned member at a point offset with respect to said axis of rotation and loosely encircling said shaft so as to be movable pivotally a limited distance, and a crank pin mounted at a free end of said linkage member.

7. Windshield wiper actuating and control mechanism, including in combination, a linkage member, means pivotally supporting said member for rotation in opposite directions about a point disposed to one side of the pivotal point, whereby the effective radial length of said member is dependent upon the direction of rotation, a crank pin mounted at the free end of said linkage member, means for limiting the pivotal movement of said linkage member, and switch operating cam means rotatable by said supporting means.

8. Windshield wiper actuating and control mechanism, including in combination, a cam defining supporting member, means including a shaft for rotating said member about a predetermined axis, a linkage member pivotally mounted upon said supporting member at a point offset with respect to said axis of rotation and loosely encircling said shaft so as to be movable pivotally a limited distance, and a crank pin mounted at the free end of said linkage member.

9. A windshield wiper actuating and control mechanism, including in combination, means including a reversible electric motor and a variable length crank arm for actuating the windshield wiping element, said crank arm having a shorter effective length when the motor rotates in a forward direction than when it does when it rotates in a reversible direction, and means controlling the energization of the motor including a multi-position control switch, a parking switch and circuits controlled by the control switch for energizing the motor through the parking switch only in the reverse direction of rotation of the motor.

10. A windshield wiper actuating and control mechanism, including in combination, means including a reversible electric motor and a combined variable length crank arm and cam for actuating and controlling the windshield wiping element, said crank arm having a shorter effective length when the motor rotates in a forward direction than when it does when it rotates in a reverse direction, and means controlling the energization of the motor including a manually operable multi-position control switch, a parking switch operated by said cam, and circuits controlled by the control switch for selectively energizing the motor for two speed operation in a forward direction independently of the parking switch and in the reverse direction through the parking switch.

ROBERT B. MORTON.

REFERENCES CITED

The following references are of record in the file of this patent:

UNITED STATES PATENTS

| Number | Name | Date |
| --- | --- | --- |
| 2,153,030 | Venable | Apr. 4, 1939 |
| 2,357,152 | Whitted | Aug. 29, 1944 |
| 2,376,010 | Sacchini et al. | May 15, 1945 |